United States Patent [19]
Harness et al.

[11] Patent Number: 6,074,613
[45] Date of Patent: Jun. 13, 2000

[54] APPARATUS FOR MULTIPLE, SIMULTANEOUS SYNTHESIS OF ORGANIC COMPOUNDS

[75] Inventors: James R. Harness, Lake Zurich; Larry W. Markus, Mundelein; Tadeusz J. Wozny, Mundelein; Rudy H. Haidle, Evanston; Kenneth R. Kaufhold, Niles, all of Ill.

[73] Assignee: Bohdan Automation, Inc., Mundelein, Ill.

[21] Appl. No.: 09/031,187

[22] Filed: Feb. 26, 1998

Related U.S. Application Data

[62] Division of application No. 08/741,194, Oct. 29, 1996, Pat. No. 5,762,881.

[51] Int. Cl.[7] ................................................ B01L 3/00
[52] U.S. Cl. ................................ 422/101; 366/336
[58] Field of Search ................... 422/99, 101; 210/348, 210/464, 455; 202/237; 435/287.6, 304.1; 366/336

[56] References Cited

U.S. PATENT DOCUMENTS

| | | | |
|---|---|---|---|
| 3,861,652 | 1/1975 | Clark et al. ............................. | 366/336 |
| 4,295,974 | 10/1981 | Cornell .................................... | 422/101 |
| 4,990,253 | 2/1991 | Vcelka .................................... | 210/359 |
| 5,143,854 | 9/1992 | Pirrung et al. . | |
| 5,282,981 | 2/1994 | Adams et al. .......................... | 210/789 |
| 5,324,483 | 6/1994 | Cody et al. . | |
| 5,397,179 | 3/1995 | Berlin et al. ............................ | 366/336 |

OTHER PUBLICATIONS

Fisher Scientific Catalog, "Fisher 88" General Aparatus p. 377, 1988.

*Primary Examiner*—Jill Warden
*Attorney, Agent, or Firm*—Dorn, McEachran, Jambor & Keating

[57] ABSTRACT

A method and an apparatus for multiple, simultaneous synthesis of compounds. The apparatus includes a reaction block having a heating layer, a cooling layer, each of which may perform both functions, and a collection sump. A plurality of reaction tubes are supported in the reaction block in a matrix. Each reaction tube has a top outlet, a bottom outlet and a filter above the bottom outlet. Spool valves are located to control the bottom outlets of the reaction tubes. Obturators are provided to close the top outlets of the reaction tubes and to provide venting for the reaction tubes. The collection sump alternately may be equipped with individual collection tubes for each reaction tube. Each reaction tube is formed with a restrictive waist and protrusions arranged in a pattern between the waist and its bottom outlet to improve the mixing of the resinous solid supports by creating turbulence. The restrictive waist limits the height of the vortex of solution during mixing and reaction to facilitate heating and refluxing. The method includes introducing a pressurized inert gas through the lower outlets of the reaction tubes and selectively filter the spent reactants and synthesized compounds through the filters.

2 Claims, 8 Drawing Sheets

APPARATUS FOR MULTIPLE, SIMULTANEOUS SYNTHESIS OF ORGANIC COMPOUNDS

This is a division of application Ser. No. 08/741,194, filed Oct. 29,1996, now U.S. pat. No. 5,762,881 which is incorporated herein by reference.

BACKGROUND AND SUMMARY OF THE INVENTION

This invention is directed to an apparatus for multiple, simultaneous synthesis of organic compounds, particularly for the synthesis of compounds by solid phase chemical reactions.

Reaction blocks for the multiple, simultaneous synthesis of solid state organic compounds are known in the prior art. One such prior art apparatus is shown in U.S. Pat. No. 5,324,483, dated Jun. 28, 1994, to Cody et al., but it fails to teach or suggest the advantages and functions of this invention which are:

An apparatus for multiple, simultaneous synthesis of organic compounds using reaction tubes having top and bottom outlets whose bottom outlets are controlled by valves to selectively permit purging of the reaction tubes, introduction of bubbling gas for mixing and agitation, filtration to remove reactants and filtration to recover products cleaved from resinous solid supports;

An apparatus for the synthesis of organic compounds which selectively permits batch collection of spent reaction solvents or the discrete collection of the synthesized products;

An apparatus for the synthesis of organic compounds in an array in which sectional layers of the reaction block are removable and replaceable to provide alternately the disposal of indiscriminately mixed discharges from the reaction tubes and the discrete collection of the synthesized products filtered from the reaction tubes;

An apparatus for the synthesis of organic compounds in an array having obturators for the top outlets of the reaction tubes which are removable and replaceable to alternately provide pressurization of the reaction tubes and refluxing at ambient pressure during organic synthesis;

A reaction tube which improves the mixing of resinous solid supports by creating turbulence to maintain the resinous solid supports in suspension during reactions;

A reaction tube which limits the height of the vortex of solution in the tube during mixing and reaction to facilitate heating and refluxing during synthesis of compounds;

A reaction tube which permits bottom filtration of a synthesized product from the reaction tubes.

Other objects and advantages of this invention will be found in the following specification, claims and drawings.

BRIEF DESCRIPTION OF THE DRAWINGS

The invention is illustrated more or less diagrammatically in the following drawings wherein.

DESCRIPTION OF THE PREFERRED EMBODIMENT

One arrangement of the apparatus of the present invention as shown in FIGS. 1, 2, 3, 7 and 9 of the drawings consists of a reaction block 21 which contains and supports a quantity of reaction tubes 23. For sake of illustration and not by way of limitation, the accompanying drawings and specification describe a reaction block containing 40 reaction tubes. However, it should be understood and appreciated that a reaction block having a greater or lesser number of reaction tubes is entirely within the scope of the invention. Further, the reaction block is shown and described in the accompanying specification and drawings as having a horizontal cross section which is rectangular in shape. A reaction block having a square or circular horizontal cross section is also entirely within the scope of the present invention.

As shown in the drawings and as is customary, the reaction block 21 is formed in horizontal sections and in this arrangement it includes a reaction section 27, a collection section 29 and a reaction tube top closure section 31. It is an advantageous feature of this invention that both the collection section 29 and reaction tube top closure section 31 are detachable from the reaction block and substitutable during different sequences of operation of the reaction block such as synthesis, cleavage and refluxing.

The reaction block 21 and its component sections are constructed of materials such as aluminum, stainless steel, polytetrafluorethylene (PTFE), ceramics or various other types of plastics, metals or glass. The reaction tubes 23 normally will be formed of glass but other materials such as PTFE, stainless steel, etc., may be used taking into consideration the required resistance to the resins and organic reactions which are necessary to handle the processes involved.

The reaction section 27 includes a heating and cooling layer 35 which is, in effect, a rectangular block of aluminum having top and bottom surfaces, side and end walls all of which are conventional. To receive and support the reaction tubes 23, an array of aligned vertical passages 37 extending from the top surface of the heating layer through the bottom surface thereof are formed therein. Each of the vertical passages 37 is cylindrical in horizontal cross section and is of slightly greater diameter than that of the reaction tubes 23 which will fit therein. The heating and cooling may be applied to the side and end walls of the heating layer from an external perimeter heating device which is not shown in the drawings for clarity of illustration. The perimeter heating and cooling device may be U-shaped to permit it to be moved into and out of contact with the side and one front or rear wall of the reaction section 27. The provision of a perimeter heating and cooling device eliminates the need to provide passages in the layer for heating and cooling fluids.

A heating and cooling or refluxing layer 47 also formed of a rectangular block of aluminum is mounted above the heating layer 35 by bolts 49 which extend through spacers 51 leaving an air gap 53 between the layer 35 and the refluxing layer. In lieu of the air gap, the bottom surface of the layer 47 may be insulated but the use of an air gap provides the advantage of visual access to the interior of the reaction block 21. The refluxing layer also is formed with an array of vertical passages 55 aligned with and corresponding in size to the passages 37 formed in the heating layer 35 and adapted to receive the reaction tubes 23. The heating and cooling may be applied to the side and end walls of the refluxing layer from an external perimeter heating and cooling device which is not shown in the drawings for clarity of illustration but may be essentially the same shape as the previously referred to external heating and cooling device.

Figure 10:
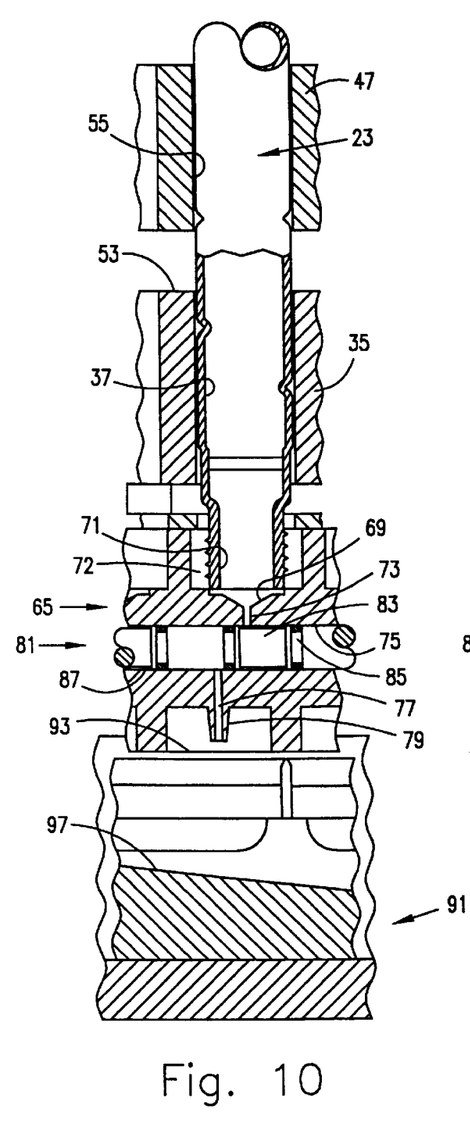
FIG. 10 is an enlarged, partial cross sectional view of a reaction tube showing the spool valve blocking the outflow from the reaction tube.
Figure 11:
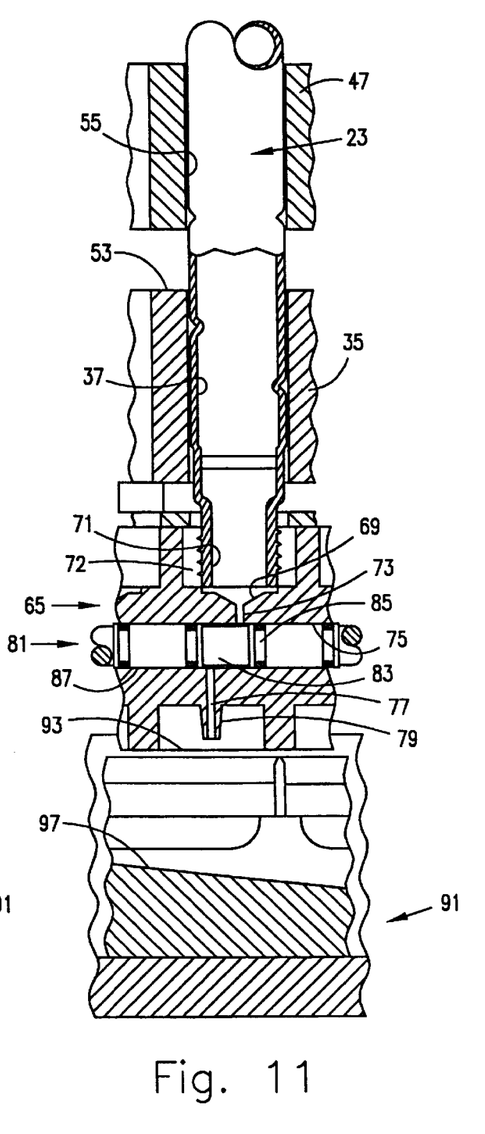
FIG. 11 is a view similar to FIG. 10 but showing a moved position of the spool valve allowing outflow from the reaction tube.

A rectangular valve body 65 formed of a suitable material such as a polymer sold under the trademark Teflon is mounted under and supports the heating layer 35 by means of spacers 67. The valve body includes an array of wells 69 extending downwardly from its top surface with the number of wells equal to and aligned with the vertical passages 37 and 55 formed in the heating layer 35 and cooling and reflux layer 47, respectively. Each well is formed with threads 71 (FIGS. 7, 10 and 11) on the internal side wall of insert 72. Drain bores 73 extend downwardly from the bottoms of the wells 69 into a horizontally extending spool passage 75. A continuation drain bore 77 is longitudinally offset from its drain bore 73 and extends downwardly from the bottom of the spool passage 75 to exhaust through a nozzle 79 at the bottom of the valve body 65. A spool valve 81 having lands 83 and grooves 85 is mounted in the spool passage 75 for sliding movements shown in its relation to the entire reaction block in FIGS. 2 and 5 and in enlarged detail in FIGS. 10 and 11. O-rings 87 are installed in the grooves abutting the ends of the lands for sealing purposes with the spool passage. The O-rings are preferably made of a tetrafluorethylene fluorocarbon polymer sold under the trademark "KALREZ" by E.I. DuPont de Nemours Co. and provides chemical resistance. The lands 83 have external diameters less than the internal diameter of the spool passage 75 and each land has a length substantially equal to the longitudinal spacing between a drain bore 73 and its continuation bore 77 so that in one longitudinal position of the spool valve (FIG. 11) a land 83 connects the drain bores 73 and 77 and in the other position (FIG. 10) the O-rings block communication between the drain bores. The spool valve 81 is pivotally connected to a rod 89 which in turn is pivotally mounted on a bracket 91 attached to a side wall of the heating layer 35. Rotation of the rod 89 about its bracket pivot result in horizontal movement of the spool valve 81 to open and close communication of the drain bores 73 with their respective continuation drain bores 77.

Each spool valve 81 controls five wells 69 and, in effect, controls five reaction tubes 23 since the tubes are arranged in an array having a spacing of five tubes in one direction and eight tubes in the other direction. Accordingly, there are eight spool valves 81 each individually controlled by a rod 89 in the reaction block of this invention allowing for simultaneously opening and closing of the bottom outlets of five reaction tubes by movement of a rod 89.

A sump housing 91 having the same horizontal configuration as the valve body 65 is attached to the underside of the valve body 65 and is formed of a suitable material such as aluminum. The sump housing has an open top 93 separated from the bottom of the valve body. The sump housing 91 includes a sloped bottom wall 97 leading to a center drain channel 99 which in turn leads to a side wall outlet 101. Threaded passages (not shown) may be provided in the sump housing adjacent to the side wall outlet to provide an inlet for pressurized gas or vacuum and to also provide for the installation of a pressure/vacuum gauge.

The sump housing 91 is removably connected to the valve body by overcenter attachment clips 105 attached to the outer walls of the sump housing. Each overcenter attachment clip includes an inverted J-shaped arm 107 which is received on a J-shaped clip 109 attached to the outer wall of the valve body 65. Upwardly tapered alignment clips 111 are attached to the outer walls of the sump housing to receive and align the valve body 65 as it is mounted in position on top of the sump housing 91. The rigid construction of the sump housing and the attachment clips permit the sump housing to be pressurized or operate under vacuum.

The drawings show only one reaction tube 23 installed in the reaction block 21 for clarity of illustration but it is apparent that because of the particular array of aligned vertical passages 37, 55 which extend through the reaction block that the block will handle forty reaction tubes. As is most clearly shown in FIG. 9, each reaction tube includes a top outlet 121 and a bottom outlet 123. Exterior threads 125 are formed at the top outlet and exterior threads 127 are formed at the bottom outlet. A filter 129 of fritted glass is positioned inside the reaction tube at a location above the bottom outlet 123. A number (in this example 6) of inwardly extending protrusions 131 are formed in a pattern in the thin wall of the reaction tube in the area immediately above the filter. Formed intermediate the ends of the reaction tube is a waist 133 of reduced diameter. The protrusions 131 improve the mixing of resin and solid supports in solution during reaction by creating turbulence to maintain the resinous solid supports suspended in the solution during the reactions. The waist 133 limits the height of the vortex of the solution and suspended materials in the tube during mixing and reacting. Limitation of the height of the vortex of the solution prevents the solution from extending into the area of the refluxing layer 47 since it should be noted that the waist 133 of a reaction tube is positioned to align with the lower end of the refluxing layer when the tubes are supported in the reaction block 21.

A threaded cap 141 formed of a suitable material such as a fluorocarbon polymer sold under the trademark "KEL-F" which resists heat and corrosion is provided for each reaction tube 23 and threads onto the top threads 125 thereof. A passage 143 extends through the top of the threaded cap to provide access to the interior of the reaction tube through its top outlet 121. A socket wrench (not shown) may be provided to attach and remove the threaded cap 141 from the top of each reaction tube 23.

The reaction tube top closure plate assembly 31 is made in two arrangements. The plate assembly 151 shown in FIGS. 1, 2, 3 and 7 of the drawings is used during the reaction and other stages of the synthesis of compounds where it is desired to plug the top outlets of the reaction tubes. The plate assembly 151 includes a rectangular top plate 153 attached to stop/guide posts 155 which are mounted for sliding vertical movement in vertical passages formed in the refluxing layer 47 and the heater layer 35 of the reaction block 21. A vertical retention mechanism for the plate assembly 151 includes a pair of rods 161 mounted on the top plate 153 with threads at the lower end of the rods which fit into threaded sockets 165 formed in the top of the heater layer 35. Hand wheels 167 affixed to the threaded rods 161 are mounted above the top plate 153 and biased by Bellville type springs 169 to lock the threaded rods in a selected position when the stopguide posts bottom at 170 in their vertical passages. Extending downwardly from the underside of the top plate 153 are plungers 181 with one plunger provided for each reaction tube in the array. Each plunger is mounted in a passage 183 which extends through the top plate 153. Each plunger has a tapered obturator portion 185 which seats in a passage 143 in the threaded cap 141 closing the top outlet 121 of each reaction tube to open and close the tube as shown in detail in FIG. 7. A coil spring 187 is positioned between each obturator portion 185 of each plunger and the under surface of the top plate 153 to allow opening movement of the obturator portion 185 to provide uniform sealing and, as required, pressure relief for the reaction tube.

A headed fastener 189 is installed in the upper end of each plunger 181 to prevent the plunger from being inadvertently removed from the passage 183. Lifting plates 191 are located on opposite sides of the reaction block 21 and are attached to the heating and cooling layer 35. Handles 193 are attached to the lifting plates.

Figure 1:
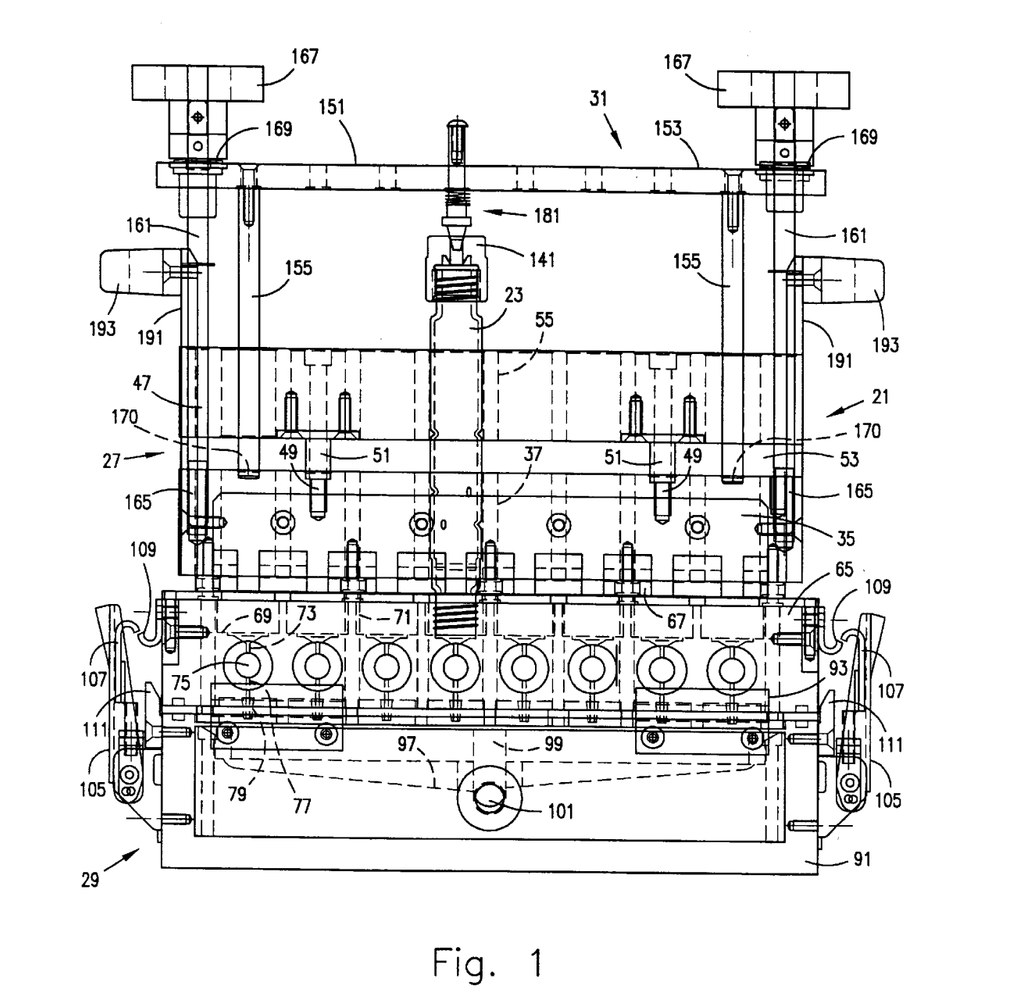
FIG. 1 is a front elevational view of one arrangement of the reaction block incorporating the novel aspects of this invention with some hidden parts shown in dashed lines and other parts omitted for clarity of illustration.
Figure 2:
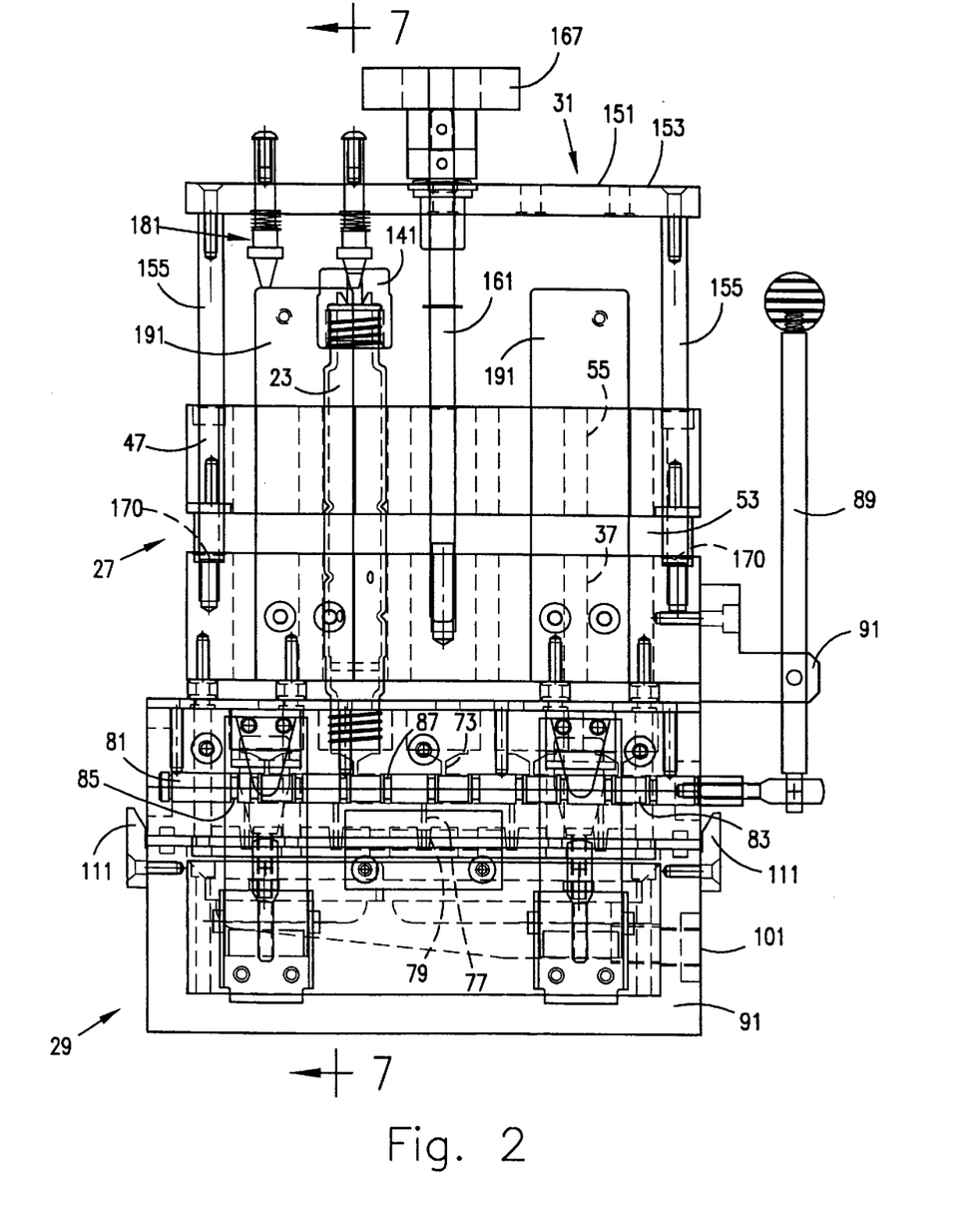
FIG. 2 is a side elevational view of the reaction block of FIG. 1 with hidden parts shown in dashed lines and other parts omitted for clarity of illustration.
Figure 3:
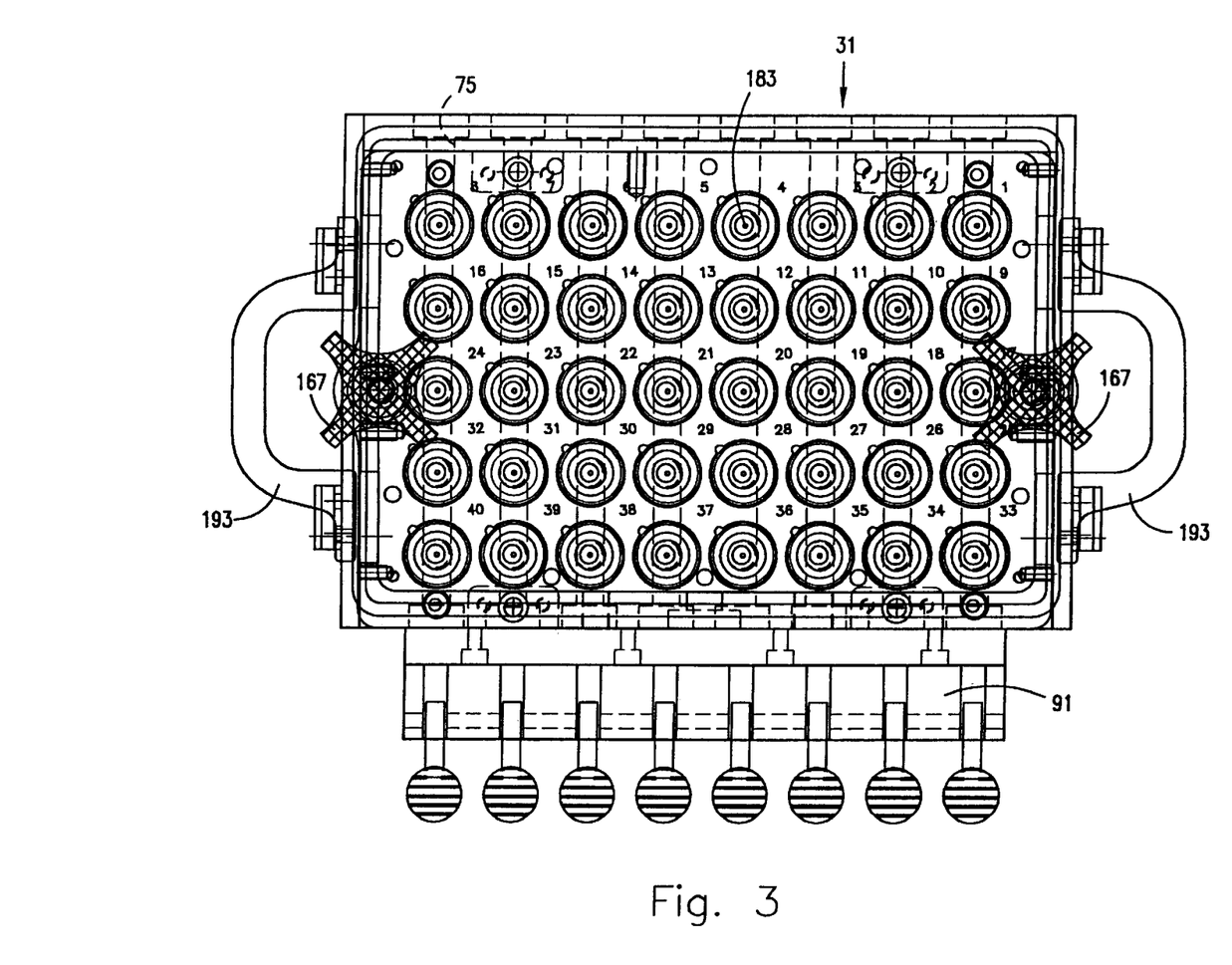
FIG. 3 is a top plan view of the reaction block of FIG. 1 with hidden parts shown by dashed lines.
Figure 4:
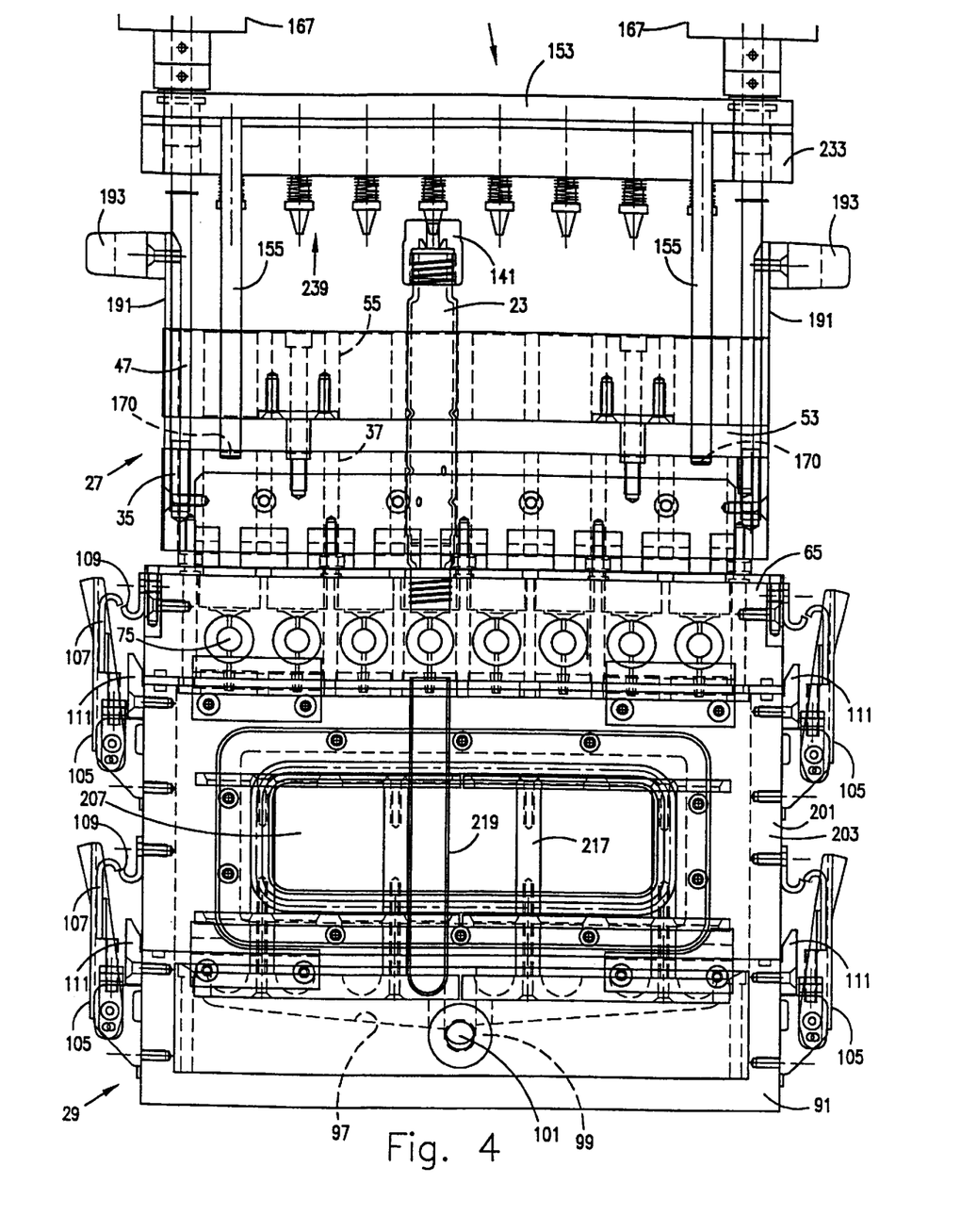
FIG. 4 is a front elevational view of a second arrangement of the apparatus of claim 1 with a modified fluid collection base and a modified top obturator member with hidden parts shown in dashed lines and other parts omitted for clarity of illustration.
Figure 5:
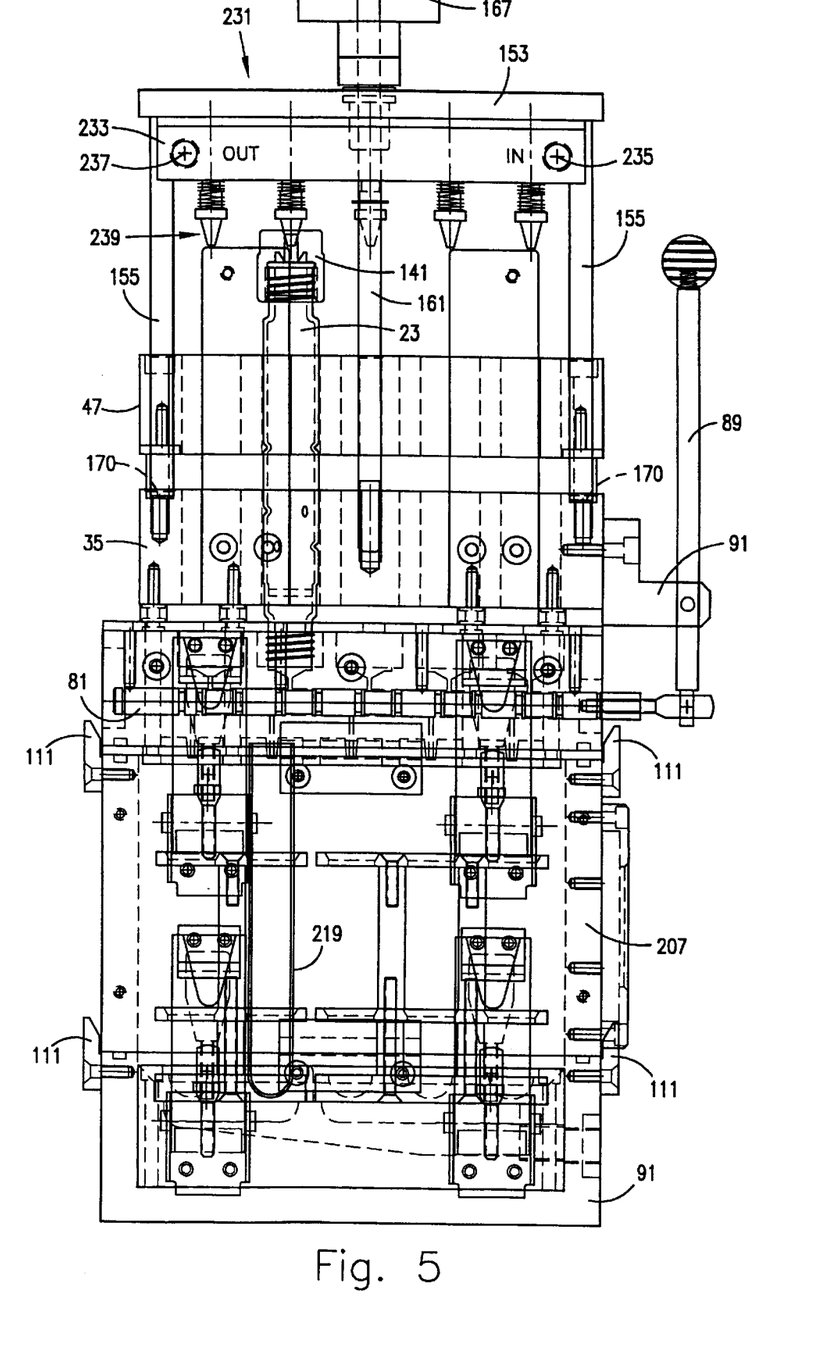
FIG. 5 is a side elevational view of the apparatus of FIG. 4 with hidden parts shown in dashed lines and other parts omitted for clarity of illustration.
Figure 6:
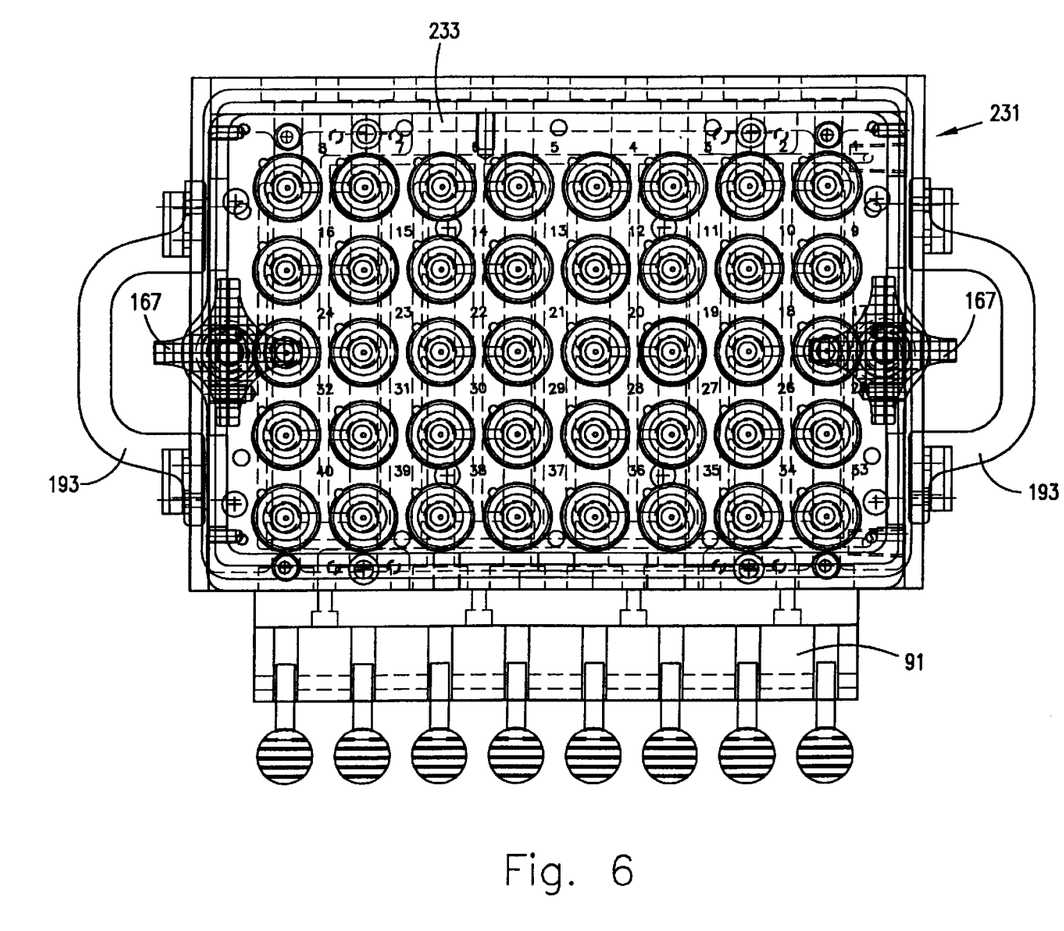
FIG. 6 is a top plan view of the apparatus shown in FIG. 4 with hidden parts shown in dashed lines.

When the synthesis of the organic compounds have been completed in the reaction tubes 23 and it is desired to discretely collect the synthesized chemicals from each reaction tube, the reaction block is modified by adding a rectangular spacer sleeve 201 between the sump housing 91 and the valve body 65 to create the arrangement shown in FIGS. 4 and 5 of the drawings. This sleeve is made of a suitable material such as aluminum and is formed with the same rectangular horizontal footprint as the sump housing 91. The sleeve includes side walls 203 and end walls 205 one of which walls is equipped with a window 207 made of a suitable glass and held in position by a bezel 209. Near its top, the spacer sleeve is equipped with over center attachment clips 105 and upwardly tapered alignment clips 111 to facilitate connection of the sleeve to the valve body 65. Further, J-shaped clips 109 are located on the lower portion of the spacer sleeve so that it can be attached to the sump housing 91 by overcenter attachment clips 105.

When in the synthesized product collection phase, a collection tube rack 217 is mounted on a peripheral edge (not shown) of the sump housing 91 to receive collection tubes 219 which are preferably open top glass tubes similar to the conventional laboratory test tube. While for clarity of illustration only one such collection tube 219 is shown in the drawings, it should be understood and appreciated that there will be one collection tube for each reaction tube 23 and the collection tube rack 217 is so designed to support these tubes with each tube positioned in alignment with a drain bore 73 from a well 69 of the valve body 65.

Figures 7, 8, 9:
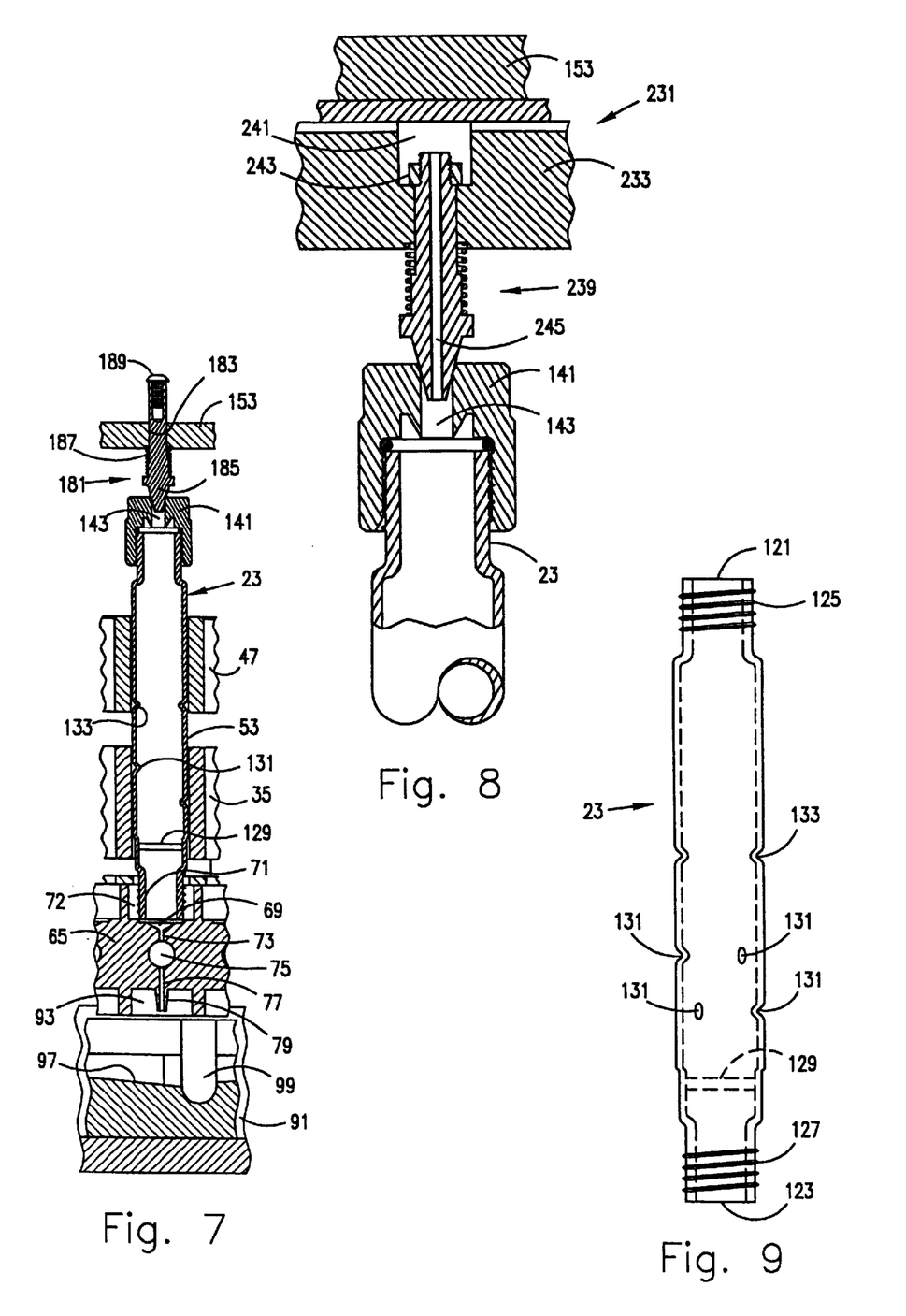
FIG. 7 is a partial cross sectional view of the reaction tube shown in FIG. 1.
FIG. 8 is an enlarged partial cross sectional view of the obturator of FIG. 4.
FIG. 9 is a side elevational view of the reaction tube of this invention.

Additionally, when the reaction block 21 is modified for refluxing, as shown in FIGS. 4, 5, 6 and 8 of the drawings, a revised top plate assembly 231 is mounted above the heating layer 35 on the corner posts 155. This modified plate assembly includes the top plate 153, stop/guide posts 155 and threaded rods 161 with hand wheels 167 for manually securing the assembly in a selected position when the stop/guide posts bottom at 170 in their vertical passages. In this modified form of top plate assembly, a runner housing 233 is attached to the under side of the top plate 153 with the runner housing having an inlet and an outlet 235 and 237, respectively (FIG. 5) for the removal of vapors as required during the refluxing process. The plungers 239, which are attached to the under side of the runner housing 233 in passages 241 and held by nuts 243, have axial passages 245 extending therethrough as shown in FIG. 8 of the drawings to permit the vapors from the reaction tubes 23 through the passages 143 in the threaded caps 141 and out through the outlet 237 of the runner housing 233. Thus, vapors can be removed from the reaction tubes 23 through their top outlets 121 during refluxing of the organic products in the reaction tubes and at atmospheric pressure.

What is claimed is:

1. A reaction tube for use in an apparatus for multiple, simultaneous synthesis of compounds including:

an elongated tubular, thin-walled body having a top outlet and a bottom outlet, a filter in said tubular body positioned above said bottom outlet, inwardly extending protrusions formed in said thin-walled body and arranged in a pattern above said filter, a restrictive waist formed in said thin-walled body above said protrusions, and threads formed around said top outlet and a threaded cap received on said threads.

2. The reaction tube of claim 1 in which threads are formed around said bottom outlet for attaching said reaction tube to a valve body.

* * * * *